United States Patent [19]

Callaway et al.

[11] Patent Number: 5,255,361
[45] Date of Patent: * Oct. 19, 1993

[54] METHOD OF AND SYSTEM FOR UPDATING A DISPLAY UNIT

[75] Inventors: Janet R. Callaway; John M. McConaughy; Steven T. Pancoast, all of Austin, Tex.; Joan M. Thompson, Albuquerque, N. Mex.

[73] Assignee: International Business Machines Corporation, Armonk, N.Y.

[*] Notice: The portion of the term of this patent subsequent to Aug. 27, 2008 has been disclaimed.

[21] Appl. No.: 680,218

[22] Filed: Apr. 4, 1991

Related U.S. Application Data

[63] Continuation of Ser. No. 287,751, Dec. 19, 1988.

[51] Int. Cl.$^5$ .............................................. G06F 15/62
[52] U.S. Cl. ................................................... 395/162
[58] Field of Search ................ 364/518, 521; 395/164, 395/162

[56] References Cited

U.S. PATENT DOCUMENTS

| | | | |
|---|---|---|---|
| 4,119,953 | 10/1978 | Yeschick | 340/324 |
| 4,461,263 | 3/1987 | Perlman et al. | 364/900 |
| 4,642,790 | 2/1987 | Minshull et al. | 364/900 |
| 4,646,261 | 2/1987 | Ng | 364/900 |
| 4,665,501 | 5/1987 | Saldin et al. | 364/900 |
| 5,043,919 | 8/1991 | Callaway et al. | 395/164 X |

FOREIGN PATENT DOCUMENTS 0117281 9/1984 European Pat. Off. .

OTHER PUBLICATIONS

"Software for Interactive On-Line Conferences" S. K. Sarin, Irene Greif, ACM-SIGOA Proceedings on Office Information Systems, Toronto, Canada, Jun. 25-27, 1984.
"Computer-Based Real-Time Conferencing Systems" S. Sarin, I. Greif, Computer, Oct. 1985, pp. 33-45.
"Cognoter, Theory and Practice of a Colab-orative Tool" G. Foster, M. Stefik, 1986, pp. 7-15.
"Wysiwis Revised: Early Experiences with Multiuser Interface" M. Stefik, D. Bobrow, S. Lanning D. Tatar, G. Foster, Dec. 3-5, 1986, pp. 276-290.

Primary Examiner—Heather R. Herndon
Attorney, Agent, or Firm—H. St. Julian; Mark E. McBurney

[57] ABSTRACT

This invention relates to updating a display unit associated with a remote computer system communicating with a host computer system. Information, which is currently being displayed on the display unit and information to be displayed thereon are compared to determine any differences which exist therebetween. If the differences exceed a predetermined value, a update command is generated and transmitted by the host computer system to the remote computer system along with the information to be displayed if facilitate the updating of the display unit. If the differences do not exceed the predetermined value, it is determined which of a plurality change categories should be used to transmit the differences to the remote system in the most efficient manner. An update command, which is associated with the selected one of the plurality of change categories, and data representing the differences are then enqueued for transmission to the remote system to facilitate the updating of the display unit.

9 Claims, 6 Drawing Sheets

METHOD OF AND SYSTEM FOR UPDATING A DISPLAY UNIT

This is a continuation of copending U.S. application Ser. No. 07/287,751 filed on Dec. 19, 1988.

DESCRIPTION

1. Technical Field

This invention relates to method of and system for updating a display in an information processing system and more particularly, to method of and system for transmitting only changes in a display associated with a host unit to update a display associated with a remote unit.

2. Background Information

In remote control processing systems today, there exists a critical need to monitor dynamically changing host screen activity and transmit screen changes to a remote system. Generally, host-based systems include a main processor which is coupled to a controller unit by a channel The controller typically has a plurality of terminals coupled thereto. When the main processor wants to display data on display units associated with the plurality of terminals, a block of display data is forwarded over the channel to the controller unit. The controller unit distributes the data to the respective terminal or terminals. In order to improve the efficiency of the transmission of display data between the main processor and the respective terminals, the data is packed by the main processor to maximize the bandwidth of the channel. Moreover, the main processor performs partial updates of the displays associated with the plurality of terminals. In this manner, the main processor transmits to the controller unit of the terminal or terminals requiring display unit updates, the location on the display unit where the update is to take place and the display data needed for the partial update. Using this technique, if only a portion of a screen changes, only that portion which changed is updated while the remainder of the screen remains unchanged.

In personal computer-based systems, each personal computer includes a screen buffer which can be directly written to by a BIOS program associated with the respective personal computer or an application program being executed on the computer. Presently, in personal computer-based systems, there is no way of knowing what has been written to the screen buffer by the application program. Unlike the host-based system, the personal computer-based system does not include a controller which collects the display data used to update the terminals coupled thereto. Moreover, in the host-based system, the main processor does not write directly to the respective screen buffers associated with the plurality of terminals coupled to the controller. Generally, it is not unusual for the personal computer-based system to use a communication link to interconnect a plurality of computers therein. The problem of updating display units associated with the computers in the system becomes acute when the communication link is a slow telecommunication line and the display of a host computer being monitored is changing dynamically.

Consequently, there is a need for a technique for monitoring dynamically changing host computer screen activity and transmitting the screen updates to a remote system using a slow communication medium in a concise manner. Moreover, there is a need for a technique for monitoring dynamically changing host computer screen activity and transmitting the screen updates to a remote system whereby applications write directly to a screen buffer associated with the host computer.

DISCLOSURE OF THE INVENTION

This invention relates to a highly efficient remote display monitoring technique and system which utilizes a multi-stage buffering scheme and a plurality of window cache buffers. The content of a display buffer, which is associated with a host system, is copied into a host desk top buffer. An analyzer then determines whether there are any differences, which represents changed data, between the host desk top buffer and a remote image buffer which represents a current state of a remote display. Thereafter, the analyzer determines which of a plurality of categories is to be associated with the changed data. If the changed data is associated with a text string, the string is compressed and transmitted to the remote system. If the changed data is a window or text block, a determination is made whether a scroll operation has occurred. If a scroll operation has occurred, the analyzer determines the number of lines which have scrolled and transmits a scroll command along with the data associated with any new lines of text included in the host desk top buffer to the remote system. If the changed data is a window, the overlaid information is stored in a host window cache buffer and a window command is transmitted to the remote terminal.

The remote system upon decoding the window command, saves the same overlaid information in a remote window cache buffer. Otherwise, if changed data is a text block, a text block command is transmitted to the remote system.

Moreover, if the differences determined by the analyzer exceeds a predetermined amount or percentage, all of the update commands, which are presently stored in a transmission communications queue, are dequeued and the entire contents of the host desk top buffer is compressed and transmitted to the remote terminal.

BEST MODE FOR CARRYING OUT THE INVENTION

Figure 1:
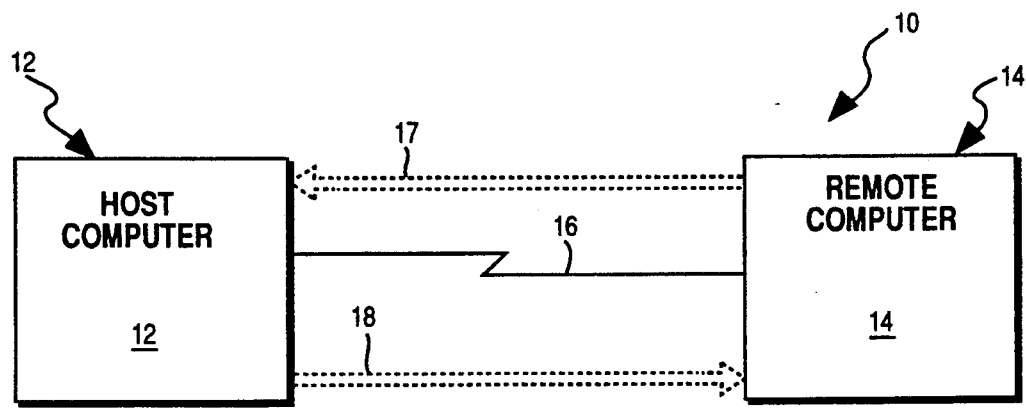
FIGS. 1, 2 and 3 are block diagrams of an information processing system on which the method of the present invention may be employed.

Referring to FIG. 1, there is shown an information processing system 10 having a first interactive type computer 12 interconnected to a second interactive type computer 14 by a communication link 16. The system 10 operates to allow each of the computers 12 and 14 to communicate with the other computer using established communication protocols whereby the communication link 16 is transparent to an end user of the system. Computer 14, hereinafter referred to as the remote computer or system 14, serves as an intelligent computer to computer 12, hereinafter referred to as the host computer or system 12. The present invention enables information which appears on a display unit associated with the host computer 12 to be displayed on a display unit associated with the remote computer 14. Display commands and data are transmitted from the host computer 12 to the remote computer 14 along the path 18 of the communication link 16. Keystroke commands and acknowledgements are transmitted from the remote computer 14 to the host computer 12 along the path 17 of the communication link 16.

Figure 2:
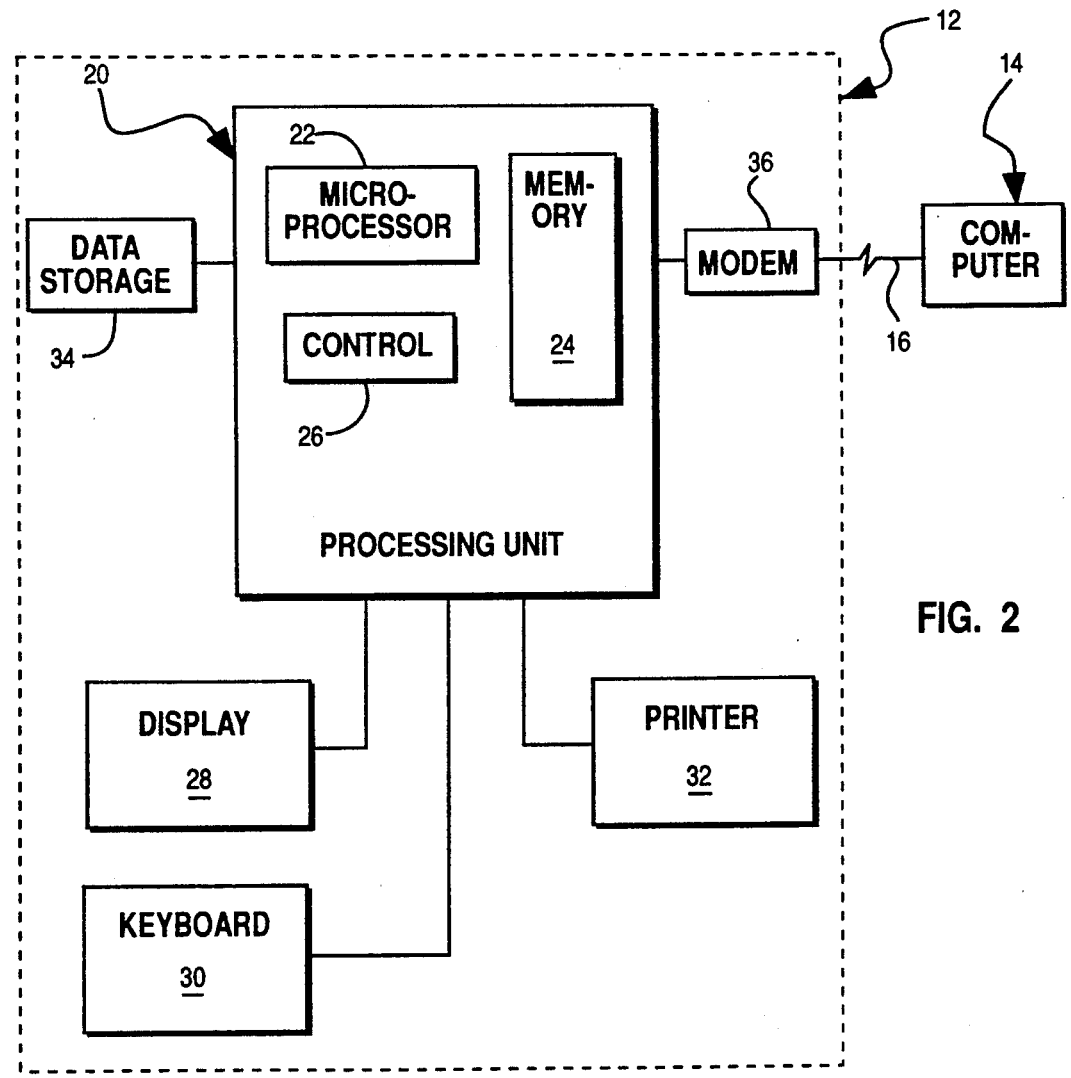

FIG. 2 illustrates a plurality of functional components which are included in the host and the remote computers 12 and 14, respectively. Each of the computers 12 and 14 includes a central processing unit 20 having a microprocessor 22, memory system 24 and a control unit 26 which controls input/output operations in additions to the interaction between the microprocessor 22 and the memory system 24. Each of the computers 12 and 14 further includes a group of conventional peripheral units such as a display device 28, a keyboard 30, a printer 32, a disk storage unit 34, and a modem 36. Since the details of the above described functional components can be readily found in the prior art, only a brief functional description of each of the components will be set forth.

The central processing unit 20 corresponds to a "system unit" of a personal computer system such as an IBM XT, an IBM AT or an IBM Personal System/2 computer system. The central processing unit 20 is provided with an operating system program which is normally employed to run the functional components. The operating system program is stored in memory system 24 along with one or more application programs that an end user has selected to run. Depending on the capacity of the memory system 24 and the size of the application programs, portions of these programs, as needed, may be transferred to the memory system 24 from the data storage unit 34 which may include, for example, a hard disk drive and a diskette drive. The basic function of the data storage unit 34 is to store programs and data which are employed by the respective computers 12 and 14 and which may readily be transferred to the memory system 24 when needed. The function of the diskette drive is to provide a removable storage function for entering programs and data into the system, and a vehicle for storing data in a form that is readily transportable for use on other interactive computers.

Display device 28 and keyboard 30 together provide for an interactive operation of the respective computers 12 and 14 wherein the interpretation that the respective computer gives to a specific keystroke by the user depends, in substantially all situations, on what is being displayed to the user at that point in time.

In certain situations, the user, by entering commands into one of the computers 12 and 14, causes the respective computer to perform a certain function. In other situations, each of the computers 12 and 14 request the entry of certain data, generally by displaying a prompt type of menu/message screen. The depth of the interaction between the user and the respective computer varies by the type of operating system and the application program, but is a necessary characteristic of the computer on which the method of the present invention may be employed.

Figure 3:
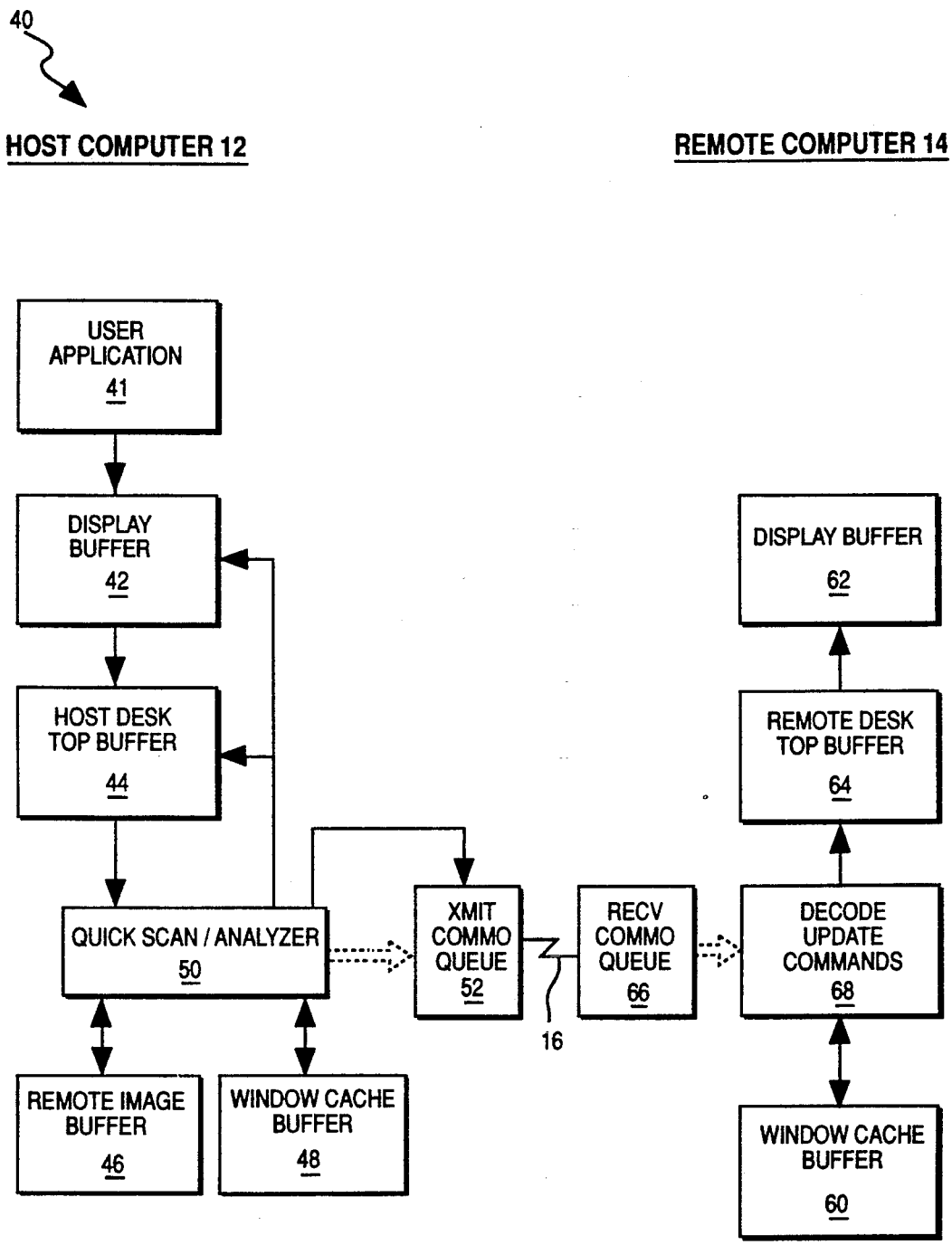

Referring to FIG. 3, there is shown a block diagram for a screen data monitoring system 40 of the present invention. The screen data monitoring system 40 includes a display buffer 42, a host desk top buffer 44, a remote image buffer 46 and a window cache buffer 48 which are stored in the memory system associated with the host computer 12 (FIGS. 1 and 2). The host computer 12 also includes a quick scan/analyzer 50 and a transmit communication queue 52. Similarly, the screen data monitoring system 40 includes a window cache buffer 60, a remote desk top buffer 62 and a display buffer 64 which are stored in the memory system associated with the remote computer 14 (FIGS. 1 and 2). The remote computer 14 also includes a receiver communications queue 66 and a command decoder 68.

The display buffer 42 contains a copy of all the characters which are displayed on a screen associated with the host computer 12 at a given point in time. The display buffer 42 also includes any attributes associated with the characters such as normal or reverse video, etc. An application program, such as user application 41 being executed on the host computer 12, normally perform input/output operations by invoking a BIOS interrupt. However, the user application 41 may write directly to the display buffer 42 at any time. Thus, the display buffer 42 may be constantly changing.

In the present embodiment of the invention, prior to analyzing the contents of the display buffer 42, the quick scan/analyzer 50 facilitates the copying of the contents of the display buffer 42 into the host desk top buffer 44. This procedure essentially takes a snapshot of the contents of the display buffer 42 at a given point in time and provides static data for comparison purposes. During the copying of the contents of the display buffer 42, all interrupts are disabled to prevent any changes from being made to the buffer. The analyzer 50 then compares the contents of the host desk top buffer 44 with the contents of the remote image buffer 46. The remote image buffer 46 normally includes data which is representative of what is being displayed on a display unit associated with the remote computer 14. However, the first time the display buffer 42 is copied into the host desk top buffer 44, the remote image buffer is undefined. Thus, the entire contents of the host desk top buffer 44 are compressed and temporarily stored in the transmit communication queue 52 for transmission to the remote computer 14. The entire contents of the host desk top buffer 44 is copied into the remote image buffer 46. At this point, a large amount of data may be queued, and it may take several seconds before the display unit associated with the remote computer 14 is updated. However, the host computer 12 immediately has available a copy of the display buffer associated with the remote computer 14.

Subsequent invocations of the analyzer compares a current snapshot of the display buffer 42 found in the host desk top buffer 44 with the contents of the remote image buffer 46. When differences are found between the two buffers, the differences are analyzed and the largest block of contiguous changed data forming the shortest or smallest possible transmission is enqueued, in the form of commands, for transmission to the remote computer 14. The differences found are also copied into the corresponding location in the remote image buffer 46.

Commands, which are transmitted from the host computer 12 over the communication link 16, are stored in the remote terminal's receiver communication queue 66. Each of the commands includes a header which identifies the type of update to be performed on the remote terminal's display unit. The decoder 68 sequentially analyzes the commands in the queue 66 to determine the type of data associated with the command. All update data is then stored in the remote desk top buffer 64 and subsequently copied to the display buffer 62. The contents of the display buffer 62 represents the image being displayed on the display unit associated with the remote computer 14.

In order for the display unit associated with the remote computer 14 to mirror the display unit associated with the host computer 12, changes in the host display must be detected quickly and transmitted to the remote computer. As noted above, instead of transmitting the entire contents of the display buffer 42 to the remote computer 14 when the display buffer 42 changes, the contents of the display buffer are analyzed. Areas of the host desk top buffer 44, which includes a copy of the contents of the display buffer 42, which are found to be different, are categorized into smaller pieces to determine the most efficient way to send the data. The analyzer 50 attempts to classify any changes into one of a plurality of change categories such as: windows, which are rectangular areas within a screen; blocks, which are changed areas having irregular right and/or left boundaries, but are nearly rectangular in shape; strings, which are changed areas on one line or contiguous lines that are not rectangular in shape; windows, strings, or blocks with changes limited to attribute bytes; and areas of the screen that have scrolled up or down.

Screen analysis begins by comparing each row of the host desk top buffer 44 with the same row in the remote image buffer 46. For each row having changed data, column numbers associated with the leftmost and rightmost changed bytes are recorded in a change table (not shown). For each contiguous set of entries in the change table, the display data is further analyzed to determine if the data has scrolled. The next phase of the screen analysis examines positions of the rightmost and leftmost changed bytes of data in the change table. When a cluster of changed rows is found, it is defined as a block, string, or window.

If all of the rightmost boundary values in a cluster of changed rows are the same and all of the leftmost boundary values in a cluster of changed rows are the same, the changed area is defined as a window. If the values of the rightmost boundary values in a cluster of changed rows are close to each other and the leftmost boundary values in the cluster are close to each other, the boundaries can be adjusted to form a rectangular area. In this case, the changed area is defined as a block. If an area of changed data cannot be defined as a block or a window, it is defined as a string or series of strings.

After a block, window or string has been identified, it is further analyzed to determine whether any of the character display attributes have changed. If only the attributes of the characters have changed, only the attribute bytes are sent to the remote computer 14.

Blocks and windows are also analyzed to determine if the changed areas were caused by a scroll up or a scroll down. If a scroll operation has occurred, in many instances it will be more efficient to transmit a scroll command in addition to the compressed data which represents any new lines of the scrolled area.

Additionally, after the analyzer has determined that a changed area in the host desk top buffer 44 is a window, The corresponding area in the remote image buffer 46 is overlaid with the window. The window cache buffer 48 is then examined to determine whether the area being overlaid has previously been identified and saved. If the area being overlaid is not stored in the window cache buffer 48, the area is then stored in the window cache buffer 48 and the display data which comprises the window is then compressed and queued for transmission to the remote computer 14. Upon receipt of the display data by the remote computer 14, a command containing the data is decoded to determine whether the data is a window. If the display data is a window, a copy of the area which is to be overlaid is copied into the window cache buffer 60 associated with the remote computer 14 Thus, both the host computer 12 and the remote computer 14 save a copy of the overlaid area. The contents of the host window cache buffer 48 and the remote window cache buffer 60 remain identical throughout the operation of system 10.

Alternately, if the window was found to have been previously stored in the window cache buffer 48, it is known that a copy of the same window data was stored in the remote window cache buffer 60. The host computer 12 needs only transmit a command to the remote computer 14 to retrieve the overlaid data from its window cache buffer 60 and redisplay the retrieved data on its display unit. In this case, none of the previously stored window data is transmitted to the remote computer 14. The window, which is being overlaid in this case, is then stored in the respective window cache buffers 48 and 60.

Figure 4:
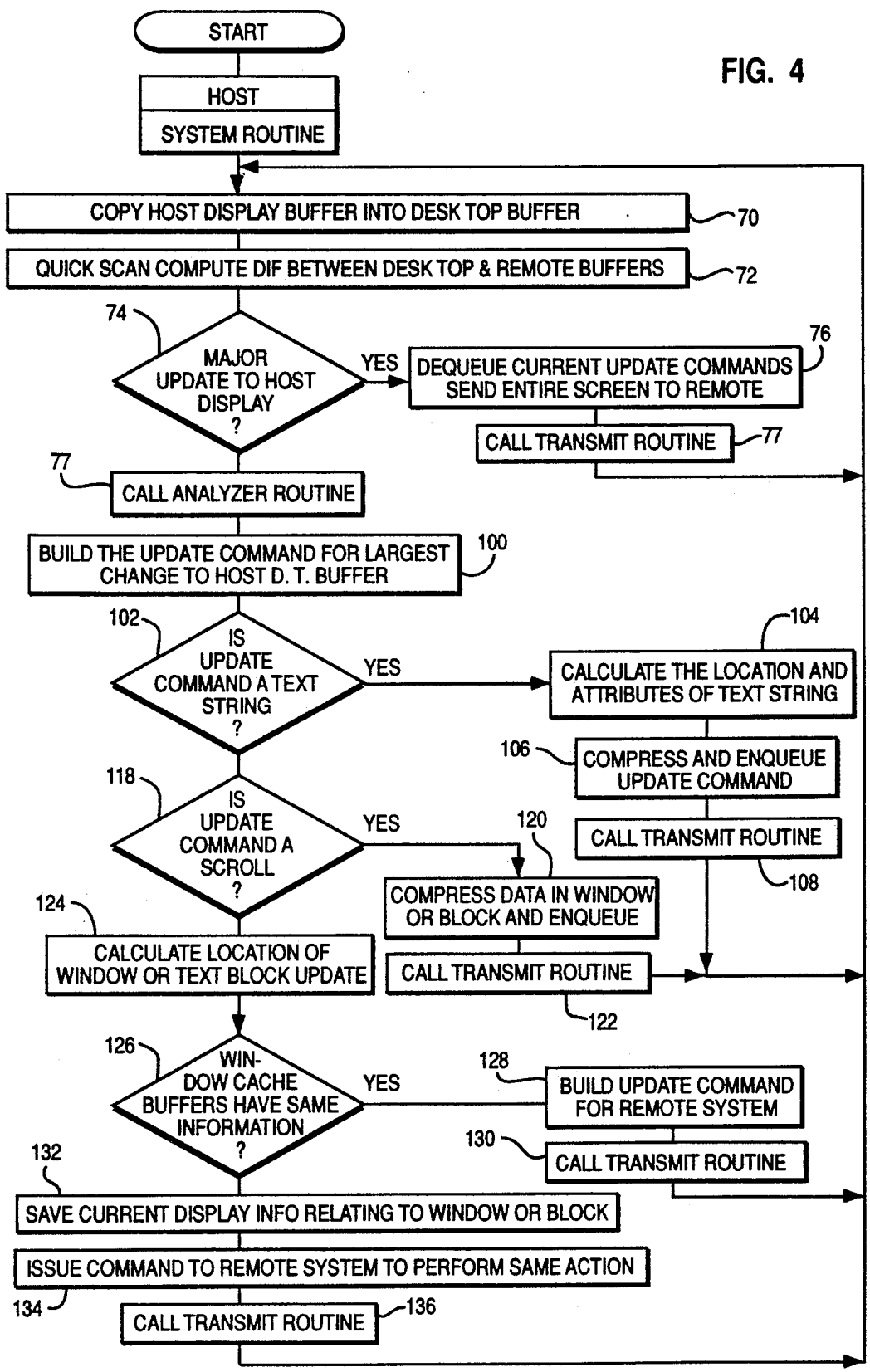
FIGS. 4 through 7 are flow diagrams illustrating the detailed steps of the method of the present invention.

Referring to FIG. 4, there is shown a flow diagram which sets forth the steps taken by the host computer 12 (FIGS. 1 and 2) in generating commands for updating a display unit associated with the remote computer 14. In step 70, the contents of the host display buffer 42 (FIG. 3) are copied into the host desk top buffer 44. A quick scan is performed in step 72 to compare the contents of the host desk top buffer 44 and the contents of the remote image buffer 46. A determination is made in step 74 as to whether the comparison performed in step 72 yielded a difference which exceeds a predetermined amount or percentage value. If the difference exceeded the predetermined amount, all previous update commands which are currently in the transmit communication queue 52 are dequeued in step 76. In step 77, a transmit routine is called to transmit the entire screen contents to the remote computer 14. The analyzer 50 is invoked by calling an analyzer routine in step 78.

Figure 5:
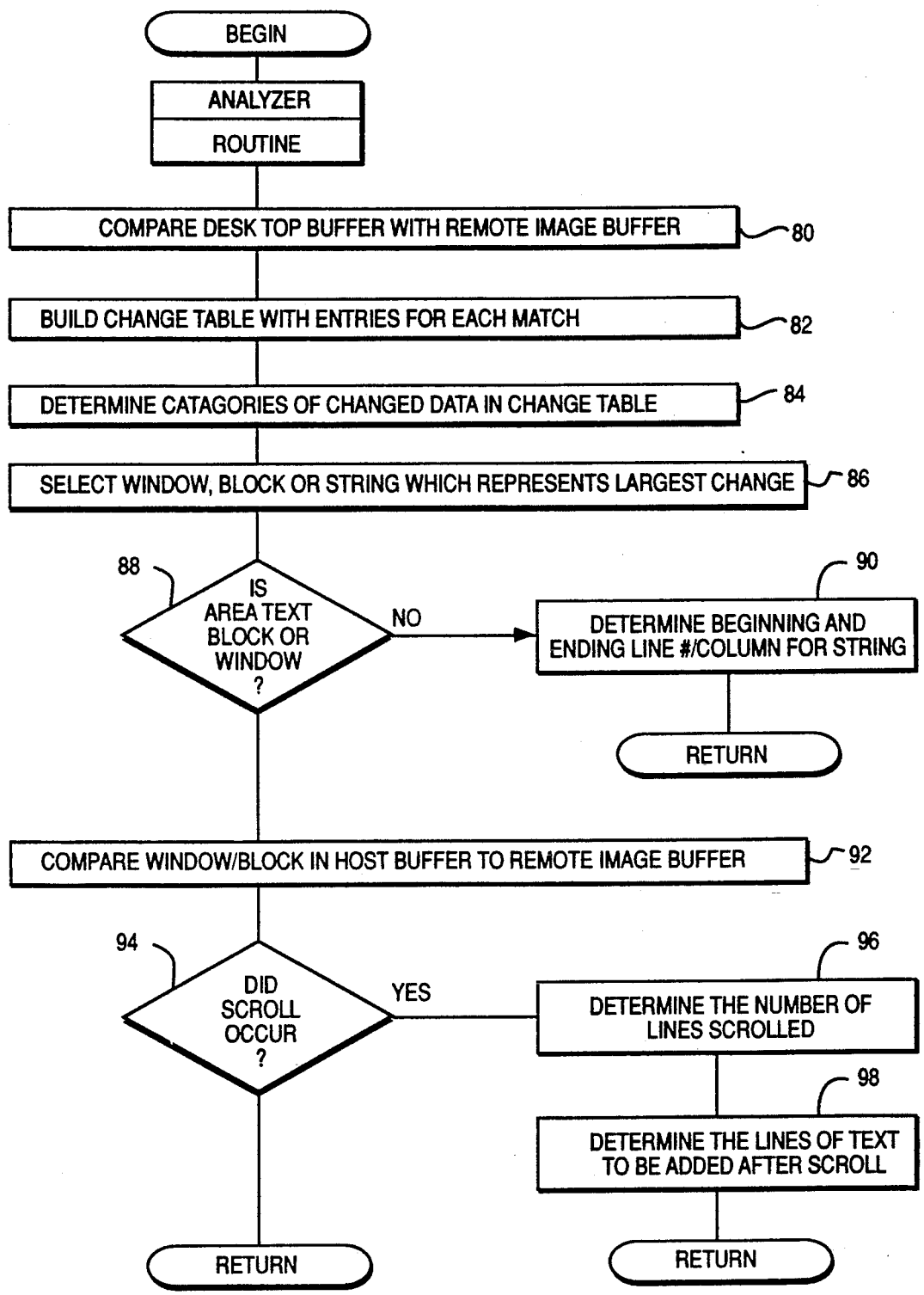

Referring to FIG. 5, there is shown a flow diagram of the analyzer routine In step 80, a second comparison of the contents of the host desk top buffer 44 and the remote image buffer 46 is performed. In step 82 a change table is generated having entries for each mismatch. Each of the entries in the change table includes a line or row number, a beginning column and an ending column. Step 84 determines, using the entries in the change table, which change category best describes each of the respective mismatch entries. As noted above, the categories are string, window and block. Step 86 selects the category which represents the largest change in display data. In step 88, a determination is made whether the selected category is a window or text block. If the selected category is not a window or text block, the category is a string and the beginning and ending line or row number and column for the string is determined in step 90. Thereafter, control is transferred to step 100 of FIG. 4.

If the category in step 88 was a window or text block, step 92, using the coordinates of the window or the text block, compares the window or text block with the contents of the remote image buffer 46. Step 94 determines if a scroll operation has occurred. If a scroll operation has not occurred, control is transferred from step 94 to step 100 of FIG. 4. However, if a scroll operation has occurred, step 96 determine the number of lines or rows which were scrolled. Step 98 determines the window or text block of new text which were added to the host desk top buffer 44 after the scroll. Thereafter, control is transferred to step 100 of FIG. 4.

Referring again to FIG. 4, step 100 builds the update command for the largest change to the host desk top buffer 44. Step 102 determines whether the update command is a text string. If the update command is a text string, the location and the attributes of the text string is calculated in step 104. Step 106 compresses the update command and adds the command to the transmit communication queue 52. The transmit routine is called in step 108 to transmit the command to the remote computer 14.

Figure 6:
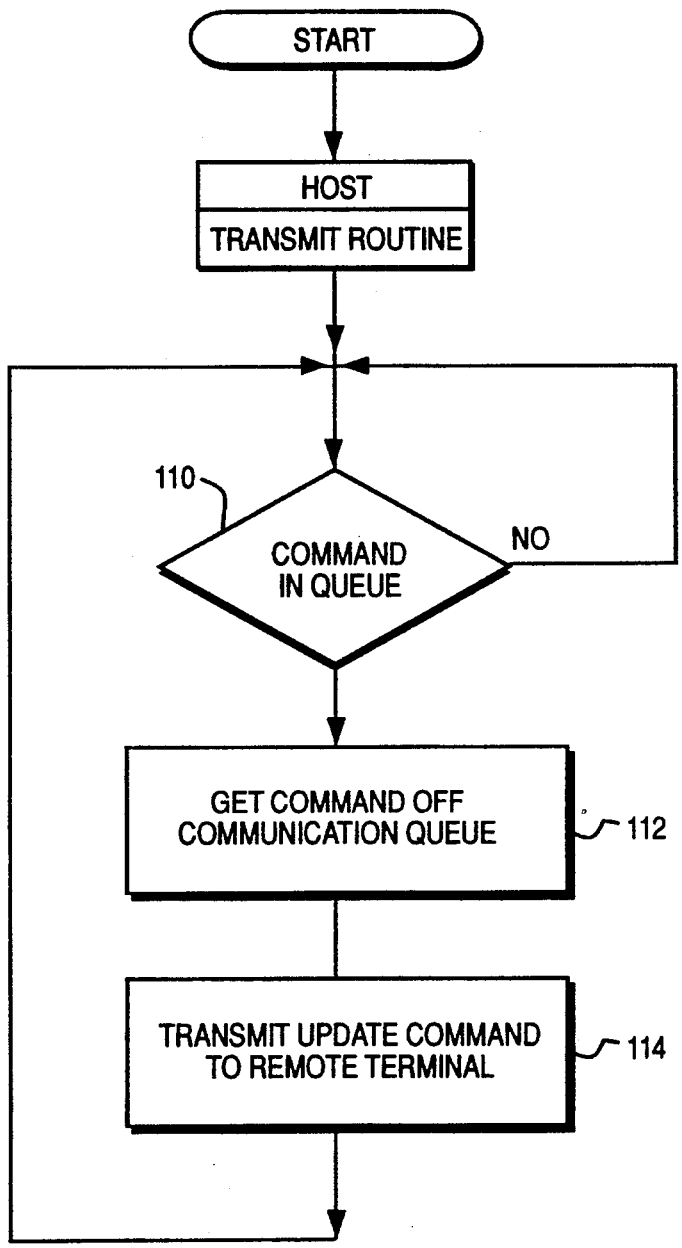

Referring to FIG. 6, there is shown a flow diagram for the transmit routine. Step 110 determines whether there is an update command in the transmit communication queue 52 to be transmitted to the remote computer 14. Step 112 gets the update command from the transmit communication queue 52 and transmits the command to computer 14 in step 114. This procedure is repeated until all of the update commands which are present in the queue 52 have been transmitted or until commands which are to be transmitted are dequeued.

Referring again to FIG. 4, if the update command was determined not to be a text string in step 102, step 118 determines whether the update command is a scroll operation. If a scroll operation has been performed, step 120 compresses the new data associated with the window or text block and places the scroll command and the compressed data, which is new to the window, on the queue 52 for transmission to the remote computer 14. The transmit routine is called in step 122 to transmit the command and the compressed data to the remote computer 14.

If the update command was not a scroll operation in step 118, step 124 calculates the location of the window or text block update. Step 126 determines whether the window has been previously stored in the window cache buffer 48. If the window is presently stored in the window cache buffer 48, step 128 builds an update command instructing the remote computer 14 to retrieve the window from its window cache buffer 60. Step 130 facilitates the calling of the transmit routine. If the window is not presently stored in the window cache buffer 48, step 132 facilitates saving the overlaid information in the window cache buffers. Step 134 facilitates the issuance of an update command and places the command on the queue 52 for transmission to the remote computer 14. Step 136 facilitates the calling of the transmit routine Step 138 updates the remote image buffer 46 with the text string, window, text block or scroll command which was enqueued for transmission to the remote computer 14.

Figure 7:
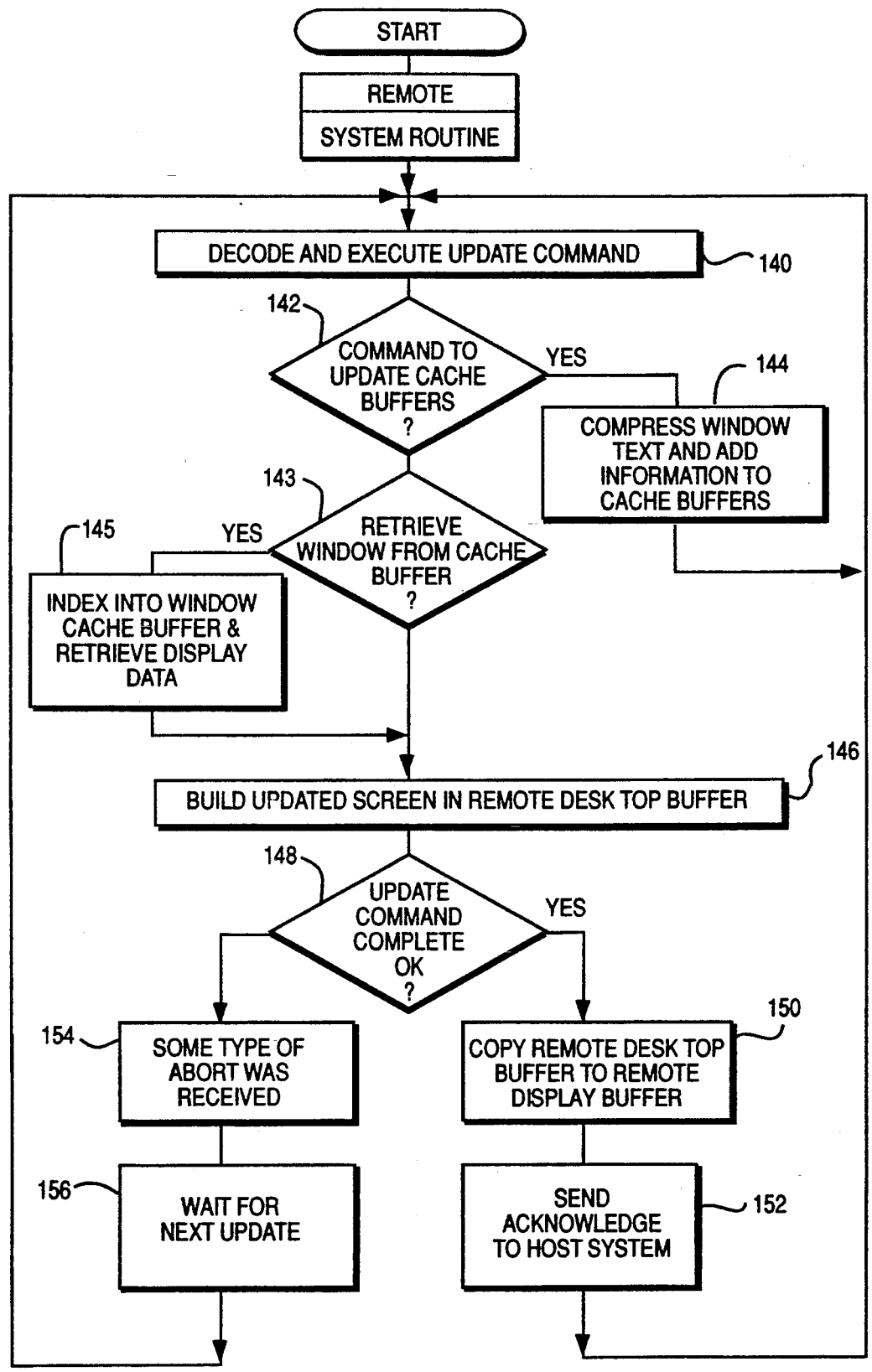

Referring to FIG. 7, there is shown a flow diagram which sets forth the steps taken by the remote computer in updating the screen in response to commands generated by the host computer 12. Update commands which are received by the remote computer 14 are stored in the receiver communication queue 66. The decoder 68 decodes one of the update commands in step 140. Step 142 determines whether the update command is a command to update the window cache buffer 60. If the window cache buffer 60 is to be updated, step 144 compresses the window data and add the information to the window cache buffers. If the update command is a command other than that of updating the window cache buffer 60, step 143 determines whether the update command is a command to retrieve a window from the remote window cache buffer 60. If a window is to be retrieved from the remote window cache buffer 60, step 145 facilitates the indexing into the remote window cache buffer 60 to retrieve the display data associated with the window to be displayed. Step 146 facilitates the building of an update screen in the remote desk top buffer 62. Step 148 determines whether the update command was completely received. If the update command was completely received, step 150 facilitates the copying of the remote desk top buffer to the display buffer 64. An acknowledgement indicating the complete receipt of the update command is transmitted to the host computer in step 152. However, if the update command was not completely received, steps 154 and 156 indicate that some type of abort has occurred and the remote computer 14 waits for the transmission of another update command.

In summary, the invention relates to a highly efficient remote display monitoring technique and system which utilizes a multi-stage buffering scheme and a plurality of window cache buffers. The contents of the display buffer, which is associated with the host computer 12, are copied into the host desk top buffer 44. The analyzer 50 determines whether there are any differences between the contents of the host desk top buffer 44 and the contents of the remote image buffer 46. The analyzer 50 then determines which of a plurality of categories is to be associated with the changed data. If the changed data is associated with a text string, the string is compressed and transmitted to the remote computer 14. If the changed data is a window or text block, a determination is made whether a scroll operation has occurred. If the scroll operation has occurred, the analyzer determines the number of lines which have scrolled and transmits a scroll command along with the data associated with any new lines of text included in the host desk top buffer 44 to the remote computer If the changed data is a window, the overlaid information is stored in the window cache buffer 48 and a window command is transmitted to the remote computer.

The remote computer upon decoding the window command, saves the same overlaid information in its window cache buffer 60. Otherwise if changed data is a text block, a text block command is transmitted to the remote computer 14.

Moreover, if the differences determined by the analyzer 50 exceeds a predetermined amount or percentage, all of the update commands, which are stored in the transmission communications queue 52, are dequeued and the entire contents of the host desk top buffer is transmitted to the remote computer 14.

While the invention has been particularly shown and described with reference to a preferred embodiment, it will be understood by those skilled in the art that various changes in form and detail may be made without departing from the spirit and scope of the invention.

What we claim is:

1. In an information processing system having a host system which communicates with a remote system, a computer program, that executes on and controls said information processing system, to selectively update a remote display unit associated with said remote system to display information being stored at said host system, said computer program comprises:

means for determining differences between information being displayed on said remote display unit and said information being stored at said host system to be displayed on said remote display unit by comparing the contents of a host display buffer with the contents of a remote display buffer associated with said remote display unit;

means for selectively one of a plurality of change categories in response to said determining means; and means for transmitting an update command from said host system to said remote system in response to said selected one of said plurality of change categories whereby only information which is different is transmitted to said remote system to update said remote display unit.

2. The computer program as recited in claim 1 further includes means for determining whether said determined differences exceed a predetermined value.

3. The computer program as recited in claim 2 wherein said information to be displayed constitutes data which is representative of an entire display screen and wherein said transmitting means includes;

means for discarding all current update commands; and means for transmitting all said data to said remote system if said determined differences exceed said predetermined value.

4. The computer program as recited in claim 1 further includes means for generating an update command for said selected one of said plurality of change categories.

5. The computer program as recited in claim 4 wherein said update command is a text string and wherein said selecting means includes:

means for calculating the position said text string will occupy on said remote display unit;

means for determining any attributes associated with said text string; and means for queuing said update command and data representing said text string, its position on said display unit and said attributes associated therewith for transmission to said remote system.

6. The computer program as recited in claim 4 wherein said update command is a scroll and wherein said selecting means includes:

means for compressing information relating to said scroll into a window; and means for queuing said update command and data representing a number of lines scrolled and any additional lines of data to be displayed on said remote display unit for transmission to said remote system.

7. The computer program is recited in claim 4 wherein said update command is a window and further includes:

means for calculating the position said window will occupy on said remote display unit; and means for determining whether said window is previously stored within said information processing system.

8. The computer program as recited in claim 7 further includes means for generating, in response to said window's being stored in said information processing system, an update command instructing said remote system to recall said previously stored window.

9. The computer program as recited in claim 7 wherein said window is not stored in said information processing system and further includes:

means for saving information currently being displayed on said remote display unit which is to be overlaid by said window; and means for issuing a command to said remote system to save said information currently being displayed on said remote display unit which is to be overlaid by said window.

* * * * *